Jan. 5, 1954  H. W. WILLINGER ET AL  2,665,250
FILTER STEM FOR USE WITH THE FILTER OF AN AQUARIUM
Filed Oct. 12, 1950
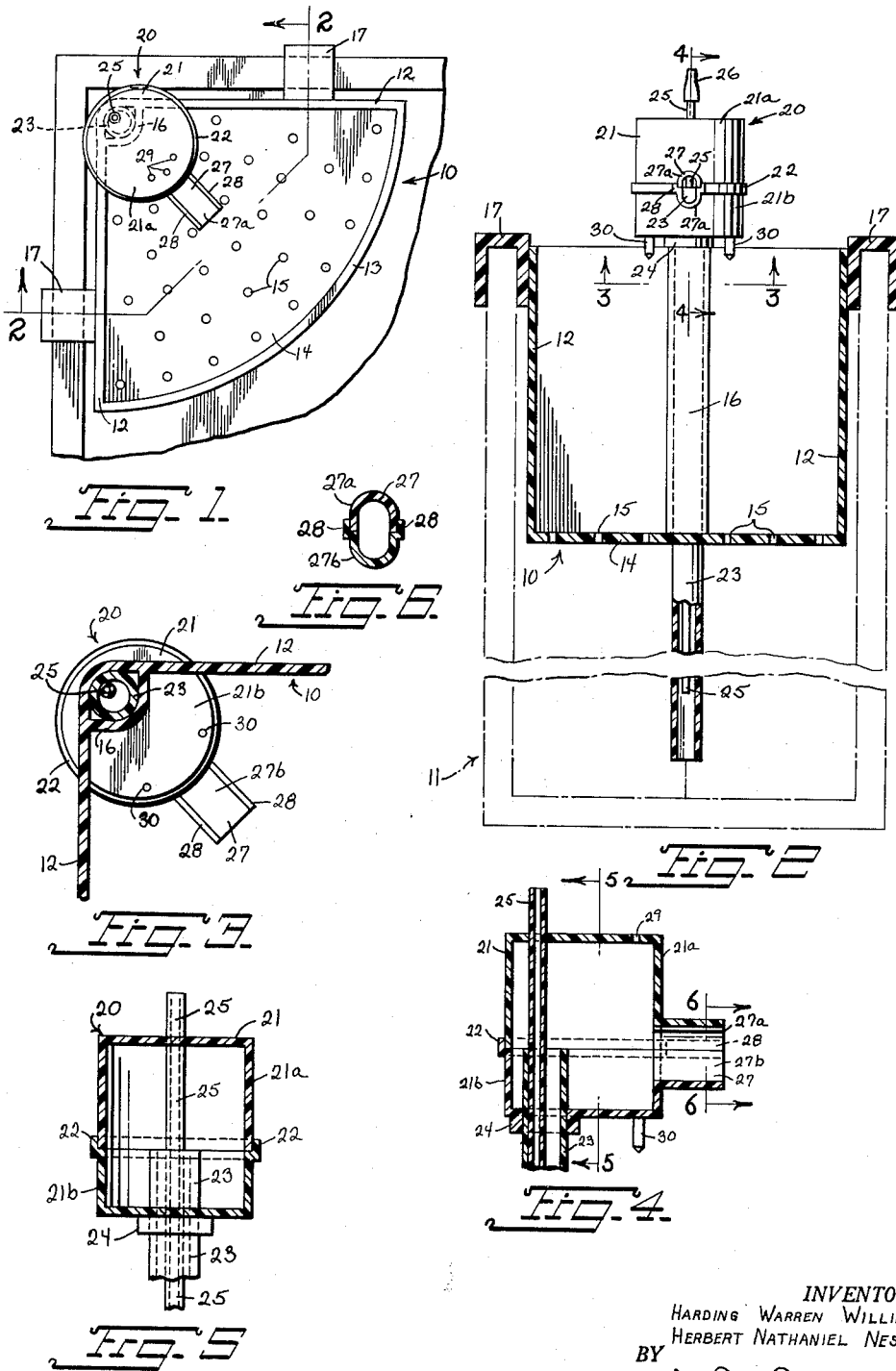
INVENTORS
HARDING WARREN WILLINGER
HERBERT NATHANIEL NESTLER
BY
John G. Schwartz
AGENT Patented Jan. 5, 1954

2,665,250

UNITED STATES PATENT OFFICE 2,665,250

FILTER STEM FOR USE WITH THE FILTER OF AN AQUARIUM

Harding Warren Willinger and Herbert Nathaniel Nestler, New York, N. Y.

Application October 12, 1950, Serial No. 189,696

4 Claims. (Cl. 210—16)

This invention relates to new and useful improvements in a filter stem for use with the filter of an aquarium.

Heretofore, it has been common practice to use in connection with aquarium filters an inverted U-shaped tube associated with a source of air under pressure for causing the aquarium water to be forced upward within one side of the tube to discharge together with the air from the other end of the U-shaped tube. The simultaneous discharge of the water and air from the U-shaped tube caused the water to impinge on the surface of the aquarium water with considerable force causing objectionable splashing of water.

The present invention proposes the construction of an improved filter stem in which the air will be separated from the water within the stem with the water flowing by gravity from the filter stem in a manner to eliminate the splashing of water which has been found so undesirable.

A further object of the present invention proposes constructing the filter stem so that the air will be caused to bubble through the water before it discharges from the filter stem with the result that it will be desirably aerated before it spills back into the aquarium.

Still another object of the present invention proposes providing the filter stem with means for engaging the inner faces of the side walls of the filter in a manner to retain the filter stem from being turned into a position in which it will discharge water outside of the filter.

It is a still further object of the present invention to construct an improved filter stem which is simple and durable, which is efficient in operation and which can be manufactured and sold at a reasonable cost.

For further comprehension of the invention, and of the objects and advantages thereof, reference will be had to the following description and accompanying drawing, to the appended claims in which the various novel features of the invention are more particularly set forth.

In the accompanying drawing forming a material part of the present disclosure:

Fig. 1 is a plan view of one corner of an aquarium having a filter including an improved filter stem constructed in accordance with the present invention.

Fig. 2 is a vertical sectional view taken substantially on the line 2—2 of Fig. 1, but with the aquarium shown in dot and dash lines.

Fig. 3 is an enlarged partial horizontal sectional view taken on the line 3—3 of Fig. 2.

Fig. 4 is an enlarged partial vertical sectional view taken on the line 4—4 of Fig. 2.

Fig. 5 is a sectional view taken on the line 5—5 of Fig. 4.

Fig. 6 is an enlarged vertical sectional view taken on the line 6—6 of Fig. 4.

The filter stem, according to the present invention, is constructed for use with an inside filter 10 which is to be suspended in one corner of an aquarium 11 for gold fish or tropical fish. The filter 10 is constructed of any desired synthetic resin and includes adjacent vertical side walls 12 having adjacent side edges secured together and with an arcuate wall 13 secured in position across the outer side edges of the side walls 12. Mounted across the bottom of the walls 12 and 13, there is a bottom wall 14 formed with a plurality of perforations 15. The adjacent side walls of the filter 10 are formed at their junction with a vertical passageway 16, see particularly Figs. 1 to 3. Mounted on the top edges of the side walls 12, intermediate of their vertical side edges, there are hooks 17 for engagement over the top edges of the adjacent side walls of the aquarium for suspending the filter 10 operatively in position within the aquarium 11.

In use, it is common to fill the interior of the filter with filter materials, such as charcoal, small stones and pebbles and glass wool (fiber glass) for filtering and purifying the aquarium water which is spilled into the top of the filter and before it passes back into the aquarium 11 through the perforations 15 in its bottom wall 14. The filter materials are not shown on the drawing and since other details of the filter 10 form no part of the present invention and are generally known by those skilled in the art to which the present invention pertains, such details will not be described.

The filter stem 20, according to the present invention, includes a hollow body 21 formed of a top part 21a and a bottom part 21b. The parts 21a and 21b are molded of synthetic resin material and the bottom part 21b is formed at its top edge with a shoulder 22 into which the bottom edge of the top part 21a is fitted. The parts 21a and 21b are fixedly joined together at the shoulder, forming an integral unit of the parts, by the application of a solvent of the synthetic resin material of which the parts are made.

An outer tube 23, also formed of a synthetic resin material, is extended vertically through the passageway 16 of the filter 10 and has the hollow body 21 mounted on its top end portion. As shown in Figs. 2, 4, and 5, the bottom wall of the bottom part 21b of the hollow body is formed with a depended tubular boss 24. The top end portion of the outer tube 23 is extended through that boss so that the top end of the outer tube will be located within the hollow body at a height substantially one-half the height of the hollow body. The outer tube 23 is made an integral unit with the hollow body by application of a solvent, for the resin materials of which those parts are made, about the tubular boss 24.

Extended vertically through the hollow body 21 there is an inner tube 25 which has its bottom end portion extended downward through the outer tube 23 with its bottom end located some distance above the bottom end of the outer tube, as shown most clearly in Fig. 2. The inner tube 25 has an external diameter less than the inside diameter of the outer tube 23 so that a clear passage exists between the outer face of the inner tube 25 and the inner face of the outer tube 23, see Fig. 4. The inner tube 25 is formed of the same synthetic resin materials used for making the body 21 and the outer tube 23, and the inner tube 25, as in the case of the outer tube, is secured in position by application of a solvent for the synthetic resin materials.

The top end of the inner tube 25 is projected above the top wall of the top portion 21a of the hollow body 21 for having one end of a length of flexible hose 26, as shown in Fig. 2, connected thereto. The other end of the hose is connected with a source of air under pressure, as is generally known in the aquarium filter art, so that the air will pass downward within the inner tube 25 and discharge into the outer tube 23.

Extended from one side of the hollow body 21 there is a discharge stem 27. The stem 27 has its longitudinal axis arranged on a level with the top end of the outer tube 23. The stem 27 is comprised of a top part 27a molded integrally with the top part 21a of the hollow body 21 and a bottom part 27b molded integrally with the bottom part 21b of the hollow body 21. The bottom part 27b, at its top edges, is formed with shoulders 28 which form continuations of the shoulder 22 of the hollow body. As in the case of the hollow body 21, the parts 27a and 27b of the discharge stem 27 are secured together by application of a solvent to the contacting surfaces of the top part 27a and the shoulder 28.

The top wall of the top part 21a of the hollow body 21 is formed with several spaced holes 29, see Figs. 1 and 4, for the discharge of air from the interior of the hollow body as will become clear as this specification proceeds.

The hollow body 21 is formed at its bottom with means for retaining the outer tube 23 from being turned, within the vertical passageway 16, into a position in which the discharge stem 27 will discharge outside of the filter 10. That retaining means comprises a pair of pegs 30 formed on the bottom of the hollow body 21 and which are molded integrally with the bottom wall of the bottom part 21b of the hollow body. The pegs 30 are located forwardly of the outer tube 23 and on opposite sides thereof to engage the inner faces of the side walls 12 of the filter 10 and so limit rotative movement of the outer tube 23 within the passageway 16.

The operation of the filter stem 20 is as follows:

With the filter 10 mounted in position on the side walls of the aquarium 11 as shown in Figs. 1 and 2, the outer stem 23 is inserted down into the passageway 16 until the bottom of the boss 24 rests on the top of the passageway limiting further downward movement of the tube within the passageway. The end of the hose 26 from the source of air under pressure, not shown on the drawing, is then connected to the top end of the inner tube 25.

In that position, the bottom of the outer tube 23 will be projected into the water of the aquarium with its bottom end spaced above the bottom wall of the aquarium, as shown in Fig. 2, so that the water of the aquarium will flow up into the outer tube 23 to the level of the water in the aquarium. The air under pressure which is forced down within the inner tube 25 will discharge from the bottom end of the inner tube 25 into the outer tube 23 and cause the water to be forced upward within the outer tube 23 and spill from the top end of the outer tube into the hollow body 21. As the water discharges from the top end of the outer tube 23, within the hollow body 21, the air will separate therefrom and all splashing caused thereby will be confined within the hollow body with the air discharging from the hollow body 21 through the holes 29. The splashing being confined within the hollow body 21 cannot cause rusting of the metal parts of the aquarium or water stain the paint or wall paper on the wall surfaces adjacent the tank.

The discharging water collects within the hollow body 21 until it reaches the level of the discharge tube 27 through which it then flows and falls by gravity into the filter 10. The falling of the water is gentle and is accomplished without splashing and continues in a steady stream as long as the filter continues in operation.

Within the filter 10, the water filters down through the filter material, not shown on the drawing, contained within the filter to remove all impurities therefrom and clarify the same from where it discharges through the perforations 15 back into the aquarium 11 to restart the cycle.

An important feature of the present filter stem is that when the air is discharging from the water, as it flows from the top end of the outer tube 23 within the hollow body 21, the air bubbles through the water which accumulates within the hollow body to aerate that water and return the necessary oxygen required for the well being of the gold fish or tropical fish contained in the aquarium.

In the preferred construction of the present invention, it is proposed that the hollow body 21, the outer tube 23 and the inner tube 25 be formed of any material which is inert in water and will not form, by oxidation or otherwise, any poisons dangerous to the fish contained in the aquarium. In this connection, the thermoplastics have been particularly useful with good results having been obtained by forming those parts of polystyrene which is the polymer of styrene ($C_6H_5CH:CH_2$).

While the filter stem is described and illustrated in use in connection with a filter of the inside type, the filter stem is equally well adapted for use in connection with a filter of the outside type. In the latter type filters a U-shaped tube operating on the siphon principle is employed for conveying the water to be filtered and clarified from the aquarium into the outside filter and the filter stem of the present invention is then used for carrying the filtered and clarified water from the outside filter back into the aquarium.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new and desire to secure by United States Letters Patent is:

1. In combination, a filter comprising a hollow casing for support within an aquarium containing water to be filtered, said hollow casing having adjacent angularly disposed vertical walls and a vertical passageway at the junction of the side walls, and a filter stem comprising an outer tube extended through said passageway and of a length to have its bottom end portion extended below the bottom of said casing into the water of the aquarium to be filtered and its top end portion extend from the top end of said passageway, an inner tube of an outer diameter smaller than the inner diameter of said outer tube and mounted fixedly within said outer tube with its bottom end above the bottom end of said outer tube and its top end extended above the top end of said outer tube for connection to a source of air under pressure which will flow down the inner tube and discharge from the bottom end thereof into said outer tube to rise within the outer tube with the water to be filtered and flow as an air-water mixture from the top end of said outer tube, a hollow body having a cylindrical side wall and top and bottom walls mounted on the top portions of said inner and outer tubes with the top portion of said inner tube extended through said top wall and the top portion of said outer tube extended into said body through said bottom wall so that the hollow body will catch the air-water mixture as it discharges from the top end of the outer tube permitting the air-water mixture to separate, a discharge stem extended laterally from the side wall of said hollow body at a level between the top of said outer tube and the bottom wall of said body so that water may flow by gravity through said stem, said top wall of said hollow body having discharge holes for the passage of air through the top wall of said body, the bottom wall of said body rests on the adjacent walls of the hollow casing limiting the insertion of the outer tube downward into said passageway, said discharge stem is located to spill the water flowing therefrom into said casing, and spaced pins are extended downward into said casing from the bottom wall of said hollow body on opposite sides of the axis of said discharge stem to engage the inner faces of said angularly disposed vertical walls to retain said filter stem from being turned relative to said filter about the axis of said outer tube to a position in which said discharge stem will spill the water outside of said hollow casing.

2. In combination, a filter comprising a hollow casing for support within an aquarium containing water to be filtered, said casing having adjacent angularly disposed vertical walls and a vertical passageway at the junction of the side walls, and a filter stem comprising a tube extended through said passageway and of a length to have its bottom end portion extended below the bottom of said filter into the water of the aquarium to be filtered and its top end portion extended from the top end of said passageway, a hollow body having top and bottom walls mounted on the projecting top end portion of said tube with said top end portion extended through said bottom wall, means for raising water within said tube to spill from the top end portion of said tube into said hollow body, a discharge stem extended laterally from the side of said body at a level between said top and bottom walls of said body so that the water within said body can flow by gravity through said stem into the filter, said body resting with its bottom wall engaging the top edges of angularly disposed vertical walls, and means extended downward from the bottom wall of said body on opposite sides of the axis of said discharge stem forming abutments for engaging the inner faces of said angularly disposed vertical walls retaining the filter stem from being turned to a position relative to said filter in which said discharge stem would spill the water outside of said hollow casing.

3. The combination set forth in claim 2, wherein said means comprises pins depended from the bottom face of said bottom wall on opposite sides of the axis of said discharge stem.

4. A filter stem for use with a filter having adjacent vertical side walls and a vertical passageway at the junction of said walls and supported within an aquarium containing water to be filtered, said filter stem comprising a tube for extension through said passageway and of a length to have its bottom end portion extended below the bottom of said filter into the water of the aquarium to be filtered and its top end portion extended from the top end of said passageway, a hollow body having top and bottom walls mounted on the projecting top end portion of said tube with said top end portion extended through said bottom wall, means for raising water within said tube to spill from the top end portion of said tube into said hollow body, a discharge stem extended laterally from the side of said body at a level between said top and bottom walls of said body so that the water within said body can flow by gravity through said stem into the filter, said body resting with its bottom wall engaging the top edges of the vertical side walls, and pins depended from said bottom wall on opposite sides of the axis of said discharge stem for engaging the inner faces of the vertical side walls preventing rotation of said body on the vertical axis of said tube to a position in which the water would spill from said discharge stem outside of said filter.

HARDING WARREN WILLINGER.
HERBERT NATHANIEL NESTLER.

References Cited in the file of this patent

UNITED STATES PATENTS

| Number | Name | Date |
| --- | --- | --- |
| 1,227,816 | Miller | May 29, 1917 |
| 1,275,592 | Oliphant | Aug. 13, 1918 |
| 1,385,708 | Oliphant | July 26, 1921 |
| 2,137,397 | Haldeman | Nov. 22, 1938 |
| 2,275,428 | Haldeman | Mar. 10, 1942 |
| 2,293,051 | Duffy | Aug. 18, 1942 |
| 2,515,538 | Wall | July 18, 1950 |